United States Patent
Agrawal et al.

(10) Patent No.: US 8,913,552 B2
(45) Date of Patent: Dec. 16, 2014

(54) SPATIOTEMPORAL ANNOTATION OF DATA PACKETS IN WIRELESS NETWORKS

(75) Inventors: Dakshi Agrawal, Monsey, NY (US); Chatschik Bisdikian, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 382 days.

(21) Appl. No.: 13/012,387

(22) Filed: Jan. 24, 2011

(65) Prior Publication Data

US 2012/0188940 A1    Jul. 26, 2012

(51) Int. Cl.
*H04W 4/00* (2009.01)
*H04L 29/08* (2006.01)
*H04W 4/18* (2009.01)

(52) U.S. Cl.
CPC ........... *H04L 67/2819* (2013.01); *H04W 4/185* (2013.01)
USPC ....................................................... 370/328

(58) Field of Classification Search
CPC ............................. H04W 8/12; H04W 64/00
USPC ....................................................... 370/328
See application file for complete search history.

(56) References Cited

U.S. PATENT DOCUMENTS

| | | | |
|---|---|---|---|
| 7,203,752 B2 | 4/2007 | Rice et al. | |
| 7,437,158 B2 | 10/2008 | Russell | |
| 2002/0023123 A1 | 2/2002 | Madison | |
| 2005/0278375 A1* | 12/2005 | Mitchko et al. | 707/104.1 |
| 2006/0069681 A1 | 3/2006 | Lauper | |
| 2006/0126645 A1* | 6/2006 | Devarapalli et al. | 370/401 |
| 2006/0281437 A1* | 12/2006 | Cook | 455/404.2 |
| 2007/0067626 A1 | 3/2007 | Louis Briancon et al. | |
| 2007/0168524 A1 | 7/2007 | Chao et al. | |
| 2007/0286195 A1* | 12/2007 | Ilnickl et al. | 370/392 |
| 2008/0090589 A1* | 4/2008 | Mikan et al. | 455/456.1 |
| 2008/0125959 A1 | 5/2008 | Doherty et al. | |
| 2008/0187137 A1 | 8/2008 | Nikander et al. | |
| 2008/0305747 A1 | 12/2008 | Aaron | |
| 2009/0054074 A1 | 2/2009 | Aaron | |
| 2009/0104919 A1 | 4/2009 | Heater et al. | |
| 2009/0248833 A1 | 10/2009 | Frazier | |
| 2010/0048222 A1 | 2/2010 | Gracieux | |

(Continued)

OTHER PUBLICATIONS

Calcev, G. et al., "Method and algorithm for near real time cellular network optimization using antenna tilt control," IP.com No. IPCOM000132037D (Nov. 29, 2005).

(Continued)

*Primary Examiner* — Brandon Renner
*Assistant Examiner* — Faisal Choudhury
(74) *Attorney, Agent, or Firm* — Preston Young; Michael J. Chang, LLC (57) ABSTRACT

Techniques for annotating data packets with time and/or location information in wireless networks are provided. In one aspect, a method for processing information streams produced by end-computing devices that are transmitted over a wireless network having at least one network element is provided. The method includes the following steps. Data packets which originate from the end-computing devices and are received by the network element are inspected for spatiotemporal metadata. Spatiotemporal metadata is inserted into the data packets and the data packets are transmitted if the step of inspecting the data packets reveals that the data packets are missing spatiotemporal metadata. Otherwise the data packets are transmitted if the step of inspecting the data packets reveals that spatiotemporal metadata is already present in the data packets.

18 Claims, 3 Drawing Sheets

(56) References Cited

U.S. PATENT DOCUMENTS

| | | | |
|---|---|---|---|
| 2011/0026464 A1* | 2/2011 | Chen et al. | 370/328 |
| 2011/0078287 A1* | 3/2011 | Pacella et al. | 709/219 |
| 2011/0080843 A1* | 4/2011 | Casey et al. | 370/252 |
| 2011/0161427 A1* | 6/2011 | Fortin et al. | 709/206 |
| 2011/0246866 A1* | 10/2011 | Abajian et al. | 715/206 |
| 2011/0302308 A1* | 12/2011 | Prodan et al. | 709/225 |
| 2012/0083289 A1* | 4/2012 | Li et al. | 455/456.1 |
| 2012/0096110 A1* | 4/2012 | Sadovsky et al. | 709/213 |

OTHER PUBLICATIONS

Choi, O.H. et al., "A Design of Location Information Management System in Positioning Systems," IEEE Computer Society, International Conference on Convergence Information Technology, ICCIT 2007, Article No. 4420246, pp. 114-120, DOI 10.1109/ICCIT.2007.254. (Jan. 1, 2007).

Agosti, M. et al., "An Architecture for Sharing Metadata Among Geographically Distributed Archives," Springer-Verlag, First International DELOS Conference (Pisa, Italy), Digital Libraries: R&D, LNCS 4877, pp. 56-65. ISSN: 0302-9743 eISSN: 1611-3349 ISBN:9783540770879 (2007).

Kim, M. et al., "Web Services framework for geo-spatial services," Springer-Verlag. 4th International Workshop on Web and Wireless Geographical Information Systems, W2GIS 2004 (Goyang Korea), Lecture Notes in Computer Science (Lect. Notes Comput Sci.) (Germany) 2005 3428/-(1-13). ISSN: 0302-9743 (Sep. 19, 2005).

* cited by examiner

SPATIOTEMPORAL ANNOTATION OF DATA PACKETS IN WIRELESS NETWORKS

FIELD OF THE INVENTION

The present invention relates to location-aware wireless networks and more particularly, to techniques for annotating data packets with time and/or location information in such wireless networks.

BACKGROUND OF THE INVENTION

Enhanced availability of mobile Internet has resulted in a hyper-growth of smart mobile applications. Many of these applications make use of spatially annotated information to provide a broad set of location-aware services such as finding the nearest (Greek) restaurant, or the nearest (cheap) gas-station, targeted mobile advertisements, and so on. The introduction of smart, sensing-enabling technologies can only hasten the growth trend of mobile applications.

Many of these mobile applications can benefit if their application (in the mobile device) or the application server (in the cloud or datacenter) is aware of the spatial coordinates of the information sources. If the source device is equipped with a global positioning system (GPS), it can attach geo-coordinate metadata to application sessions. However, possessing GPS may not always be possible (due to form factors (i.e., anything related to the form characteristics of an object such as shape, size and weight), cost reasons, energy consumption, etc.) or GPS may not be always operational, e.g., in indoor environments.

Cellular network infrastructure can provide value-add by estimating device location and creating location metadata for the device. Traditional cellular base-stations can estimate device location using transmit power. Femto cells (e.g., in homes) or pico cells (e.g., in malls), and WiFi hotspots (e.g., in airports) may be configured with location information. This information can be stored in a network provider's infrastructure and become available through a location service to end-user applications. The location service can query the infrastructure of the provider to retrieve the location of the source, or an estimate of it, that can then be used to customize the location service response to the user, for example, where a user uses her mobile telephone to connect to a location service provider, say, to search for movie theaters and movies near her location. The location service provider queries the cellular company provider for the location of the user. The cellular company provides this information using, for example, the cell tower information that the mobile telephone was connected to, assisted GPS, etc.

As can be seen from this example, the location data and hence location services are intimately tied to the cellular company provider who will also typically own the relationship with the end-user. In other words, data of spatiotemporal significance become tied to a location infrastructure and the utility of these data is restricted by the access rights to that location infrastructure, e.g., requires access to location information from a cellular company provider.

Therefore, the creation of open, smart, location-enabled applications, wherein the dependencies on existing location infrastructures are reduced would be desirable.

SUMMARY OF THE INVENTION

The present invention provides techniques for annotating data packets with time and/or location information in wireless networks. In one aspect of the invention, a method for processing information streams produced by end-computing devices that are transmitted over a wireless network having at least one network element is provided. The method includes the following steps. Data packets which originate from the end-computing devices and are received by the network element are inspected for spatiotemporal metadata. Spatiotemporal metadata is inserted into the data packets and the data packets are transmitted if the step of inspecting the data packets reveals that the data packets are missing spatiotemporal metadata. Otherwise the data packets are transmitted if the step of inspecting the data packets reveals that spatiotemporal metadata is already present in the data packets.

A more complete understanding of the present invention, as well as further features and advantages of the present invention, will be obtained by reference to the following detailed description and drawings.

DETAILED DESCRIPTION OF PREFERRED EMBODIMENTS

As described above, in order to create open, smart, location-enabled applications, the dependencies on existing location infrastructures need to be reduced. Accordingly, provided herein are techniques that allow location-based services to exist independently of associating with a location infrastructure that must be queried for location information. The present techniques allow data streams to become spatiotemporally rich even when their sources are unable to provide the necessary metadata information. Further provided herein are techniques to manage the content of metadata added to satisfy end-user preferences, such as privacy levels.

According to the present techniques, the embedding is performed by special network elements such as a WiFi base station, a gateway, a sensor network controller, etc. These network elements examine the traffic that passes through them, for example using deep packet inspection (DPI), and if the network elements find location metadata missing, the network elements insert on-the-fly the (estimated) location information of the source in the data stream.

Figure 1:
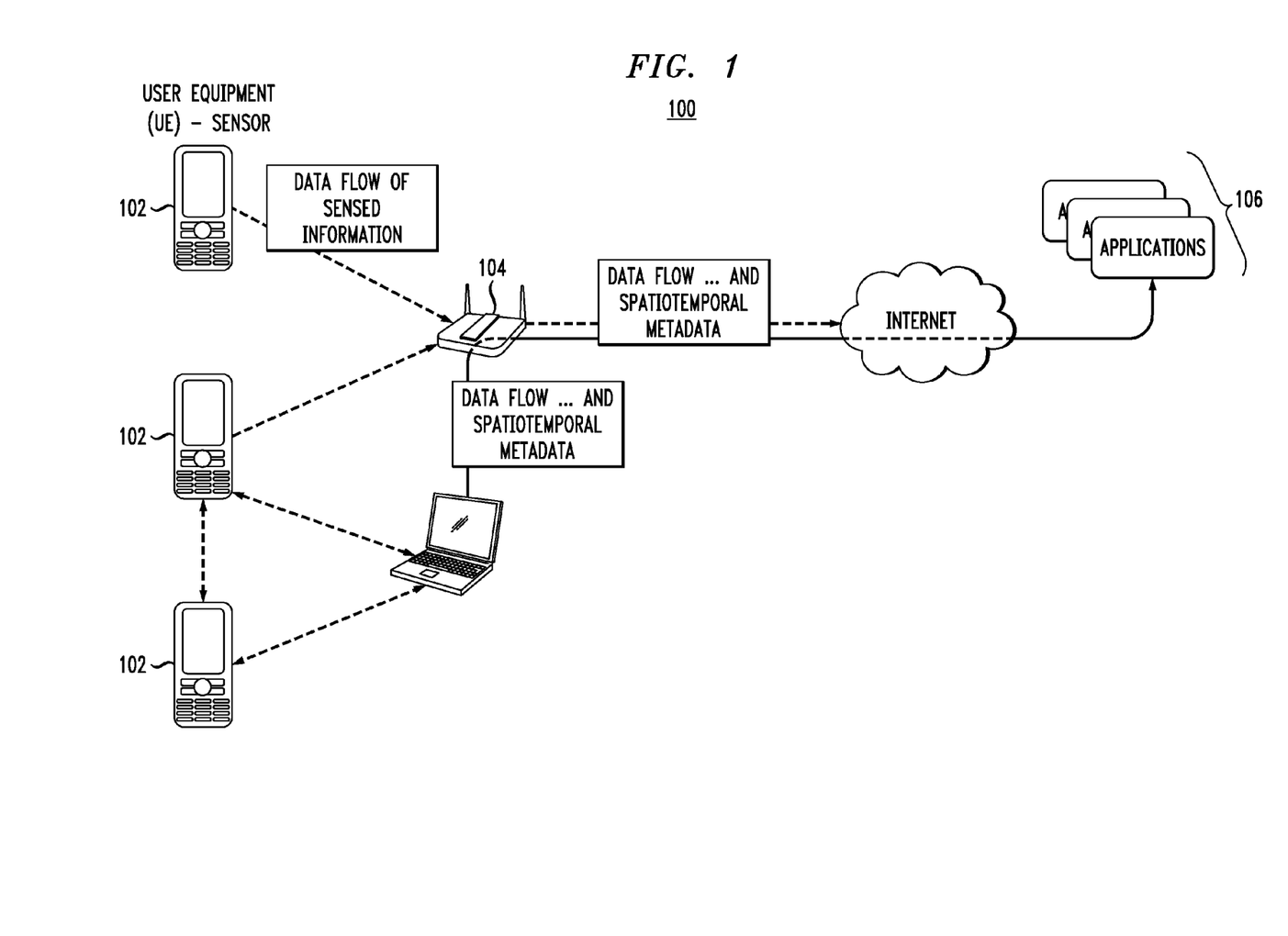
FIG. 1 is a diagram illustrating an exemplary location-aware wireless network according to an embodiment of the present invention.

FIG. 1, for example, is a diagram illustrating exemplary location-aware network 100. Network 100, in this case a wireless network, includes at least one end-computing device, i.e., user equipment (UE) 102, e.g., sensors, mobile telephones, personal digital assistants (PDAs), personal computers, laptop computers, etc., accessing internet-based applications 106 though a network element(s) 104, such as by a WiFi base station, a gateway, a sensor network controller and/or a femto cell access point (FAP) located at a home of a user. An apparatus that may serve as a network element 104 is provided in FIG. 4, described below. Information streams produced by the end-computing devices are transmitted over network 100. As will be described in detail below, according to the present teachings the network elements examine the information streams that pass therethrough, for example using deep packet inspection (DPI), and if the network elements find location and/or temporal metadata missing from application data-carrying packets, the network elements insert on-the-fly the (estimated) location and/or time information (e.g., spatial, temporal and/or spatiotemporal metadata) of the source in the information stream. The concept of deep packet inspection by network elements with capabilities to read data packets (including payload) is well known to those of skill in the art and thus is not described further herein. The information stream may also be referred to herein as data streams, with the understanding that the terms may be used interchangeably. As noted earlier, the insertion (or replacement) of the spatiotemporal information in data packets is done only to application data-carrying packets. Depending on the application context, there may not be a need to insert spatiotemporal information to data packets such as system management and control packets, set-up connection packets, etc., not meant to be "seen" and processed by end-user applications.

In the example shown in FIG. 1, there are two flows of data, a first flow and a second flow. The first data flow (indicated by dashed arrows) involves end-computing devices that do not embed location or time information in the data stream. These end-computing devices can include user equipment (UE) such as sensors and/or mobile telephones (which may be considered to be a type of sensor, see below). Network element 104, e.g., a FAP, upon inspection of the first data flow, and following consultation with privacy configuration parameters (see below), embeds, if necessary, spatial (e.g., location information), temporal (e.g., a timestamp reflecting the current clock time read by the network element) and/or spatiotemporal metadata (e.g., spatiotemporal metadata) in the data stream. Whether it is spatial metadata, temporal metadata or spatiotemporal metadata, if any, that gets embedded in the data stream depends on the design and application needs. For example, there may be a sensor system that reports information (e.g., temperature) only when the sensor system is explicitly queried by the application. In this case, the sensor may only provide the result of a temperature measurement (e.g., 22 degrees Celsius (° C.)), and include no time or location information. In this instance, embedding spatiotemporal metadata would be preferable. In other occasions, a sensor may report threshold crossings it experiences. For example, the sensor may report that the temperature has just gone past 50° C. and provides only the time when this event was noted. An application tied to the sensor measurements would deduce the sensor location by reading a sensor identification (ID) from the packet with the threshold crossing notification and mapping it to a location. Thus, in this case embedding spatial metadata would be preferable. In yet other cases, a more powerful sensor may be equipped with a global positioning system (GPS) device and thus can also add its location along with the time of a sensed event (such as the threshold crossing). In this instance, no additional spatial or temporal metadata is needed.

By way of example only, network element 104 can be configured to examine the data that passes through it, for example using DPI, and if network element 104 finds location metadata missing, incorrect existing location metadata and/or impermissible location metadata (e.g., violating set privacy policies), network element 104 can insert, remove and/or otherwise alter on-the-fly the (estimated) location information of the source and/or time data in the data stream. The concept of altering data packets on-the-fly is well known to those of skill in the art. By way of example only, writing on-the-fly is commonly done in routers which can even alter information as a packet waits to be transmitted on an outgoing port. The router may, if necessary, momentarily delay the transmission to perform this operation.

In FIG. 1, end-computing devices 102 (e.g., user equipment (UE)) produce sensed information that is then consumed by applications 106. As highlighted above, the user equipment (UE) can include sensors. A sensor can be a simple, single task entities, a sensor in the strict sense, e.g., a hazmat sensor sensing presence and/or concentration of hazardous material, a temperature sensor, a vibration sensor, an acoustic sensor, etc. A mobile telephone is an example of a multisensory device as it may include a microphone, an accelerometer, a GPS sensor and possibly a temperature sensor. Hence, the mobile telephone itself is the sensor. Alternatively, a Bluetooth®-equipped mobile telephone may collect information from multiple wearable Bluetooth®-equipped sensors carried by a person (a pedometer, a heartbeat sensor, a body temperature sensor, etc.) and then pass this information to a remote health-care monitoring application.

For the user equipment (UE) that does not embed location information into the data stream, network element 104 can insert its location information as a proxy for the location of the user equipment (UE) (with the assumption that the user is close by). Accordingly, network element 104 is preferably programmed with its location and/or has the capabilities to determine its location. By way of example only, with a FAP in a user's home the user can program the FAP with a particular address (or any other coarser/finer location information, see below). Alternatively, the FAP can have access to GPS capabilities and can determine its location automatically. The latter set-up would be beneficial for situations where the network element is moved, since it would not require any input from the user to update its location. Exemplary embodiments involving such location-aware network elements (LANEs) are described in detail below.

The location information may be coarse-grained or fine-grained depending on user preferences and the localization capabilities. For example, the process of embedding may be policy-controlled (based, e.g., on a set of permission rules, see below) to define the location granularity to be embedded in the data stream. For example, in the case of a FAP located at the home of a user that is configured to embed location information, the FAP could be configured by the user based on various criteria, so as to satisfy privacy concerns of the user. The FAP may be configured to embed home location information at various degrees of granularity, such as at the room level, the apartment level, building level, street block level, neighborhood level or nothing at all. According to an exemplary embodiment, when the location information is coarse-grained the information includes only a home address resolved to GPS coordinates, and when the location information is fine-grained the information has localization information, i.e., relative to the home address, such as room level.

A second data flow (indicated by a solid arrow in FIG. 1) involves end-computing devices (e.g., user equipment (UE)) that can collaborate to estimate, e.g., using triangulation, their local position, i.e., their location relative to each other. For example, localization may be relative to a "local" coordinate system. Upon transmitting their data, these end-computing devices embed this relative location (localization information) in the data stream they transmit (i.e., to network element 104). Network element 104, upon inspecting the data stream, and following consultation with set privacy guidelines, may refine the localization information. For example, network element 104 may alter the relative location to a global location (e.g., while the original location may be noted simply as "on the left side of the room," the generic "room" may be replaced with specific information such as "kitchen") or replace altogether the location information as in the case described above where the user equipment does not embed location information into the data stream. User equipment (UE) with location-awareness capabilities still only know a relative location with respect to say a "generic" room. Network element 104 may know that these devices are within the kitchen, so network element 104 can change the reference coordinate system from that of the room to that of the house.

While network element 104 may insert, remove and/or otherwise alter, supplement or replace the location information in the data stream as described above, other techniques may also be used to change the location information. In one exemplary embodiment, whenever network element 104 identifies missing (or non-complying, i.e., impermissible) location information in a data packet flow, network element 104 can generate a brand new data packet to the same destination that includes the updated information (assuming that it also clears any non-compliant information). Alternatively, in another exemplary embodiment, whenever network element 104 identifies missing (or non-complying, i.e., impermissible) location information, network element 104 replaces the data packet with the missing (or non-complying, i.e., impermissible) information with one that contains the allowable location information and is otherwise identical to the original packet. The implementation of both of these functions in a DPI network element would be apparent to one of skill in the art.

As highlighted above, the present techniques address several important aspects of spatiotemporal data transfer. The first aspect is being able to allow location-based services to exist independently of associating with a location infrastructure that must be queried for location information. With reference to the description of FIG. 1 presented above, the present techniques provide for the embedding of spatiotemporal metadata directly in the data (e.g., sensory data) stream. This would satisfy the first aspect as applications and services can now extract the required spatiotemporal information directly from the data stream without requiring querying for location information from a third party, such as a cellular company. The second aspect is allowing data streams to become spatiotemporally rich even when their sources are unable to provide the necessary metadata information. Again with reference to the description of FIG. 1 presented above, the present techniques provide for embedding spatiotemporal metadata to a data stream by an entity other than the source of the stream. Serving as a surrogate of the source for the purpose of enriching the data stream with spatiotemporal metadata, spatiotemporal metadata becomes available to applications and services even when the source is unable to supply the required information. The third aspect is managing the content of metadata added to satisfy end-user preferences, such as privacy levels. Again with reference to the description of FIG. 1 presented above, the present techniques provide for using configurable permission lists describing the allowable information for embedding that are consulted prior to embedding any metadata to the data stream.

Figure 2:
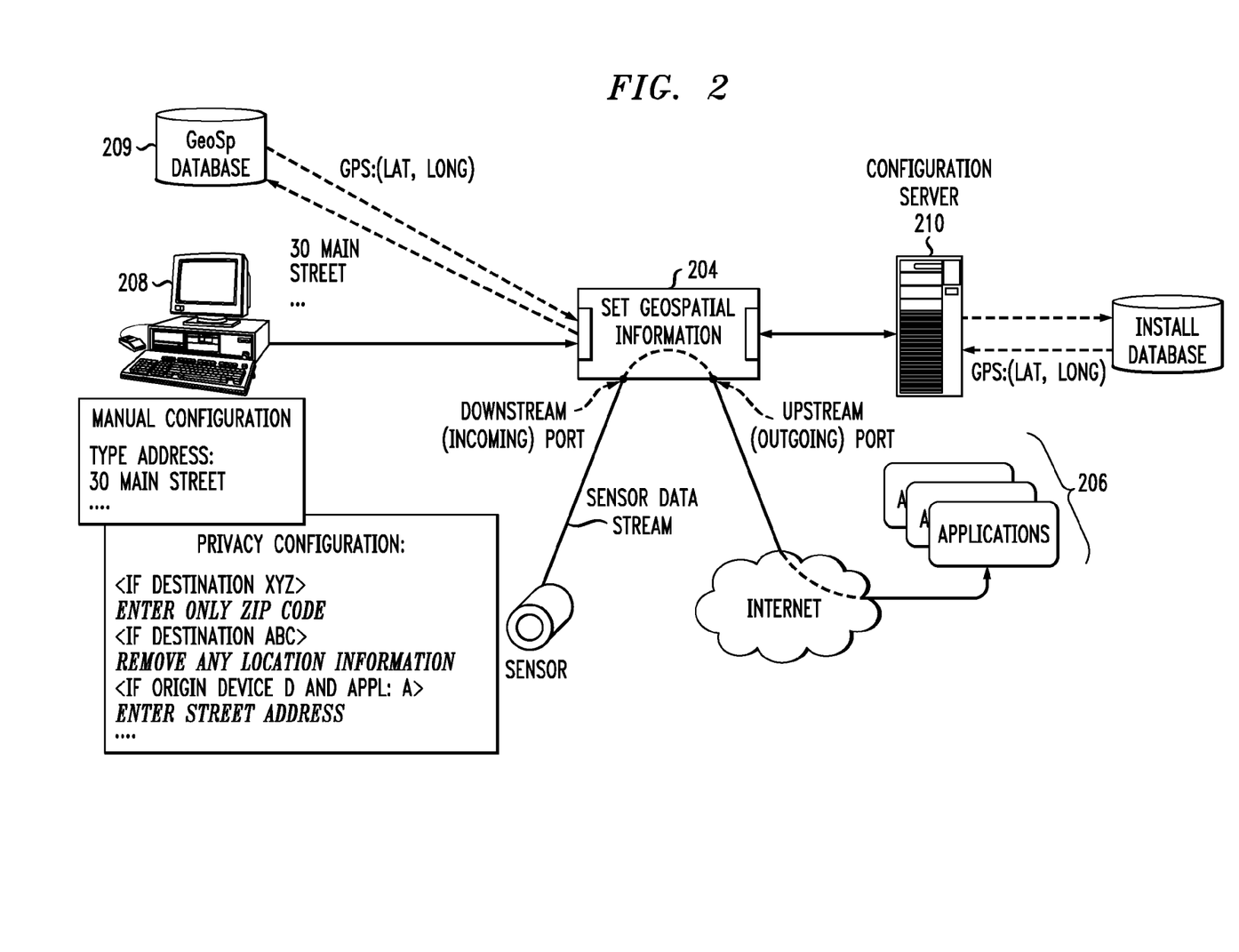
FIG. 2 is a diagram illustrating several exemplary ways by which a network element in a location-aware wireless network can attain location awareness according to an embodiment of the present invention.

FIG. 2 is a diagram illustrating some exemplary ways by which a network element in a location-aware network (such as wireless network 100 of FIG. 1, described above) can attain "location awareness." As described above, the present location-aware network includes user equipment (UE) (not shown) accessing Internet-based applications, in this case Internet applications 206, through a network element(s), in this case network element 204. As shown in FIG. 2, network element 204 includes a downstream (incoming) port through which data packets arrive and an upstream (outgoing) port through which data packets are transmitted (see below).

FIG. 2 illustrates three non-limiting exemplary methods by which network element 204 can acquire "location awareness." A location-aware network element is also referred to herein as a "LANE." The first method involves manual configuration of network element 204 by the user. Namely, a user directly enters an address (e.g., "30 Main Street") through a LANE configuration console (not shown) (e.g., through a web interface or a client application interfacing to the configuration module of the LANE). In the example shown in FIG. 2, the user accesses the LANE configuration console through a web interface via the user's personal computer (PC) 208. Optionally, network element 204 may consult with a geospatial service (having a geospatial database (GeoSp db) 209) and substitute the address provided by the user with the GPS coordinates (latitude (lat) and longitude (long)) of the location, or of an area containing the location (increase the granularity). Google maps is such a geospatial service. With Google maps, for example, a user can provide an address and retrieve the GPS coordinates of the address. For example, as shown in FIG. 2, the user has provided the address "30 Main Street" as its location and network element 204 consults a geospatial service to obtain the GPS coordinates for 30 Main Street, which network element 204 can use to replace (or alternatively supplement) the location information from the user. This option may also be beneficial in situations where, for example, the user makes a mistake in inputting his/her location and/or when the location information the user inputs is not at the same granularity level as the set policy. By way of example only, if the privacy policy in place is set at a coarser granularity than what the user has inputted, the LANE can substitute its GPS readings for that of the user's but at the correct privacy level. This would require that the network element provide location information of its own, i.e., aside from what the user provides.

The second method involves a bootstrap, or assisted configuration, i.e., wherein a network provider remotely sets the geospatial information for network element 204. Namely, a network service provider (having a configuration server 210) of the network to which network element 204 is connected remotely configures network element 204 when network element 204 powers on. According to an exemplary embodiment, an operator (from the network service provider) consults a geospatial database (install db) of the locations of its installed LANEs (which may include actual subscribers' home locations) and configures each LANE (remotely) accordingly.

The third method involves self-configuration (e.g., GPS, triangulation, etc.) by network element 204. In the third method, the LANE self-configures using GPS, triangulation information from other LANEs that already know their position, etc.

As highlighted above, the user equipment may be configured to obtain sensory information from (stationary placed) sensors, e.g., placed in buildings, on roads, etc. As shown in FIG. 2, sensory measurements obtained from these sensors are part of the data stream to the network element. Privacy guidelines may also be set at the sensor level.

Independently of how a LANE acquires its location information, end-users may set conditions of when and how to embed location information in data streams, labeled "Privacy configuration" in FIG. 2. In FIG. 2 this is shown as part of the end-user manual configuration of LANE, but alternatives are possible. As indicated in FIG. 2, through some client application running on, e.g., a personal computer, a user can manually enter (type) the location information (e.g., "30 Main Street") to be recorded in a sensory data stream. Likewise, privacy policies/configuration may be entered manually by a user through a client application. Such is the case, with social network privacy rules when, for example, a social network user specifies who can see updates in personal status information (friends, friends of friends, etc.). Spatial information may be treated in a very similar way, and describe under what conditions (the clauses, see below) spatial information may be revealed. By way of example only, a service subscriber may provide her privacy constraints to the network provider who then configures LANE accordingly as part of a service agreement the network provider has with the subscriber. In FIG. 2, the privacy configuration is shown as a collection of <if . . . then> rules, where represent conditions, such as origin of a data packet, destination of a data packet, application to which a data packet relates, time and date, etc., and <then> represent actions (shown in italics in FIG. 2) to be taken if the conditions are satisfied. Example actions shown in FIG. 2 include, adjusting the location granularity embedded in the data stream, such as just a zip code, or just a street name, or embed nothing, or even remove any geospatial information that might exist in the data stream. Using the example provided in FIG. 2, the user can designate that if the destination of the data packet is XYZ, then only zip code location information should be inserted into the data stream. On the other hand, if the data packet destination is ABC, then all location information is removed. For example, a user may share his/her full location information to a localization service for summoning a taxi cab, but only provide coarse location information that allows people to find him/her (such as friends, where the user does not necessarily want them to know exactly where he/she is, but only that the user is in the area, or in the same town). If the user configures these 'customized' privacy settings, the user can specify specific destinations/settings, groups/types of destinations, etc. For example, a user may specify location expression granules such as full address, or just street name, or just zip code, etc., and origin and destination groups, and then (using the client application) make statements of the form if data from group A are destined to group B allow location granule C. This is how social networks manage privacy rules for their content.

Figure 3:
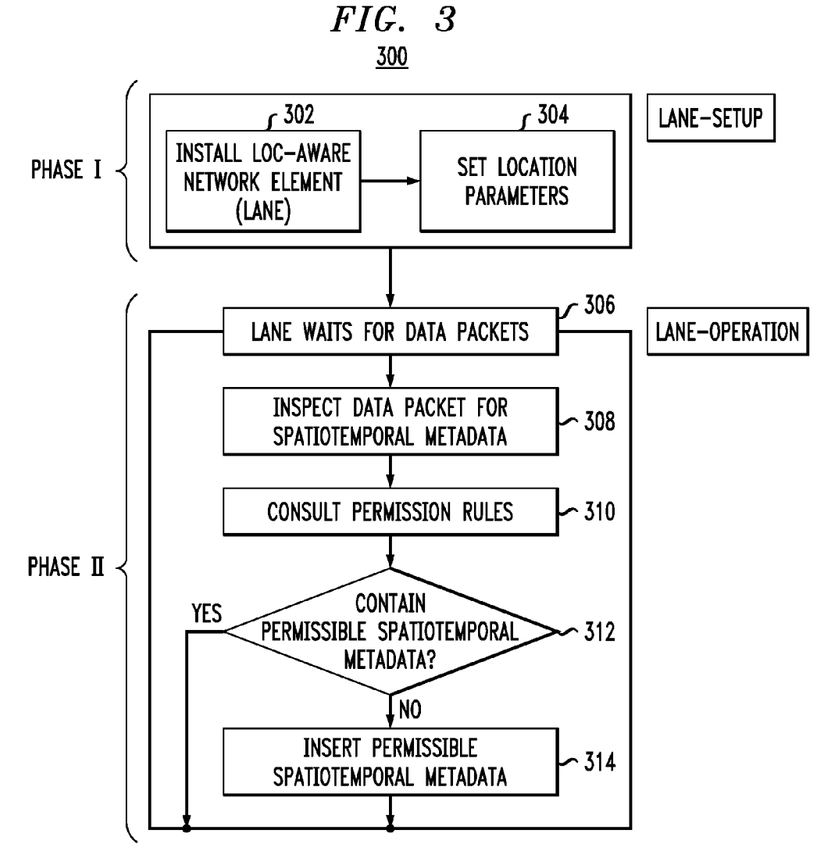
FIG. 3 is a diagram illustrating an exemplary methodology for processing information streams produced by end-computing devices that are transmitted over a network having at least one network element, such as the networks of FIGS. 1 and 2 according to an embodiment of the present invention.

FIG. 3 is a diagram illustrating an exemplary methodology 300 for processing information streams produced by end-computing devices that are transmitted over a network having at least one network element, such as location-aware network 100 described, for example, in conjunction with the description of FIGS. 1 and 2, above. Methodology 300 includes two phases, a first phase (set-up of a LANE, steps 302 and 304) and a second phase (operation of the LANE, steps 306-314). As describe above, LANE stands for location-aware network element (i.e., a network element that has "acquired" location awareness, see description of FIG. 2, above). With regard to the first phase, in step 302, the LANE is installed. A LANE, such as network element 104 was described, for example, in conjunction with the description of FIG. 1, above. In step 304, the LANE (e.g., network element 104) is configured ("set location parameters") such as acquiring location information for the LANE and configuring the <if . . . then> privacy rules (see, for example, the description of FIG. 2, above), referred to more generally as permission rules below. As described in detail below, the permission rules may also dictate when (i.e., with what frequency) spatiotemporal metadata may be inserted into the data packets. For example, the permission rules may dictate that spatiotemporal metadata may be inserted into the data packet only once per source destination flow or only once per given interval of time, e.g., once every 10 minutes. This is done for efficiency sake, i.e., to prevent taking duplicative actions.

With regard to the second phase, in step 306, the LANE (e.g., network element 104) waits for data packets arriving at a downstream port, e.g., from the sensor side (see description of FIG. 2, above). Upon receipt of a data packet, in step 308, the LANE inspects the packet for time and location information (spatiotemporal metadata). This inspection may involve deep packet inspection (DPI) techniques, as the time and location information will likely be embedded in the payload of the packet, e.g., within the payload portion of a transmission control protocol/internet protocol (TCP/IP) packet. However, the packet inspection may also include shallow packet inspection, such as inspecting the TCP/IP packet headers, to extract information that could be used later.

Upon inspection of the packet, in step 310, the LANE consults the list of permission rules for the spatiotemporal metadata in the packet and makes a determination as to whether the packet contains permissible or impermissible spatiotemporal metadata. As described above, the LANE (e.g., network element 104) may be configured directly by the user with the user's privacy guidelines and/or the privacy guidelines may be set at other levels, e.g., at the sensor. Note that even if the data packet does contain spatiotemporal metadata, the LANE may still consult the list of permission rules to determine whether supplying spatiotemporal metadata is permissible (or impermissible).

In step 312, the LANE determines whether or not the data packet contains permissible spatiotemporal metadata. If the packet contains permissible spatiotemporal metadata (i.e., the data packet meets all of the privacy guidelines), then the LANE transmits the packet out on an upstream port (see FIG. 2). The LANE then returns to waiting for a next packet from downstream and steps 306-312 are repeated. On the other hand, if the packet contains impermissible spatiotemporal metadata (i.e., the data packet violates the privacy guidelines), or if the packet contains insufficient or no spatiotemporal metadata at all, then in step 314 the LANE inserts/embeds allowable (permissible) spatiotemporal metadata in the packet accordingly and transmits the packet out an upstream port (see FIG. 2). Steps 306-312 are then repeated.

While packet inspection may be performed at each incoming packet, for example as in methodology 300, embedding of spatiotemporal metadata may occur only as often (or as frequent) as necessary. For example, the LANE may embed permissible spatiotemporal metadata only once per source destination flow (identified by a common TCP/IP address/port source and destination pair), or over a given interval of time, e.g., once every 10 minutes. Or, as a result of DPI, the LANE may embed permissible spatiotemporal metadata once per application session, or over a given interval of time, e.g., once every 10 minutes for packets that appear to be part of the same application session. In this case, the step of "insert permissible spatiotemporal metadata" is preceded by a determination of whether embedding is necessary for reasons such as the aforementioned flow or session rules.

It is notable that in step 312, the term "contain permissible spatiotemporal metadata" can be interpreted quite generically based on what permissible is. Permissible will include both the granularity of spatial information and also when the information can be permitted to be written. Hence, the example above of writing a specific piece of information every 10 minutes is an example of when a piece of spatial information can be written. To be a little more specific, by way of example only, there might be various authors of permission conditions. For example, end-users may specify content permissions (what location information can be added), operators may also provide operation permissions (when a location metadata can be added in an information stream). A LANE device will aggregate these permissions and when it performs step 312 the LANE device will decide what needs to be altered with regard to spatial metadata. Thus, the permission rules, consulted in step 310 (above), may contain an aggregation of permission rules from end-users and operators that determine the spatial information provided and the frequency by which the information is provided in the sensory streams.

The above exemplary embodiments have considered the embedding or updating of permissible spatial information in information streams passing through a network element such as network elements 104 or 204 employing techniques such as DPI. In an entirely analogous manner, permissible temporal information can also be embedded or updated in information streams. A network element, such as network elements 104 or 204, can employ a technique such as DPI to inspect a passing packet for temporal information. If temporal information is missing, a timestamp may be entered based on the time indicated by the internal clock of the network element. A user may configure the formatting details of the time, for example, to provide both time and date information, or only time, or configure the time granularity to be in minutes, seconds, milliseconds, etc. Note, that contrary to spatial information, time information can be, in general, more reliably estimated by a recipient application by simply using its own local clock. Hence, providing rules for temporal privacy may be less crucial than in the case of spatial information. Nonetheless, the same techniques employed for providing permission rules, such as using a browser application on a PC connected to the configuration module of a network element, can also be used to provide permission rules for temporal information used to configure rules for when to write and how to write (i.e., format) time information.

Figure 4:
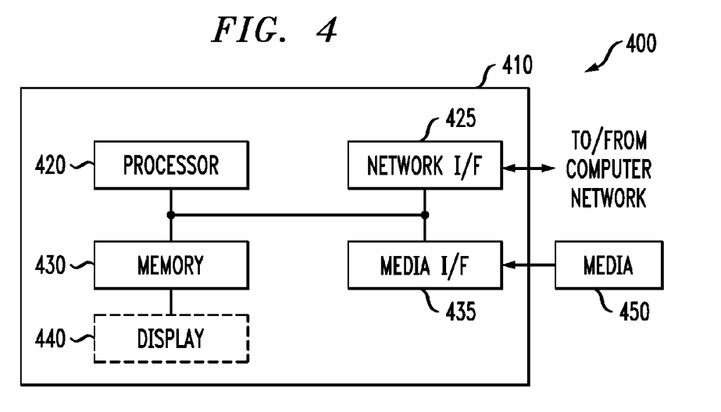
FIG. 4 is a diagram illustrating an exemplary apparatus for processing information streams produced by end-computing devices that are transmitted over a network having at least one network element, such as the networks of FIGS. 1 and 2 according to an embodiment of the present invention.

Turning now to FIG. 4, a block diagram is shown of an apparatus 400 for implementing one or more of the methodologies presented herein. By way of example only, apparatus 400 can be configured to implement one or more of the steps of methodology 300 of FIG. 3 for processing information streams produced by end-computing devices that are transmitted over a wireless network having at least one network element such as location-aware network 100 described, in conjunction with the description of FIGS. 1 and 2. As highlighted above, network 100 includes at least one network element (e.g., network element 104). Apparatus 400 can be configured to serve as one or more of the network elements in network 100.

Apparatus 400 comprises a computer system 410 and removable media 450. Computer system 410 comprises a processor device 420, a network interface 425, a memory 430, a media interface 435 and an optional display 440. Network interface 425 allows computer system 410 to connect to a network, while media interface 435 allows computer system 410 to interact with media, such as a hard drive or removable media 450.

As is known in the art, the methods and apparatus discussed herein may be distributed as an article of manufacture that itself comprises a machine-readable medium containing one or more programs which when executed implement embodiments of the present invention. For instance, when apparatus 400 is configured to implement one or more of the steps of methodology 300 the machine-readable medium may contain a program configured to inspect data packets which originate from the end-computing devices and are received by the network element for spatiotemporal metadata; and insert spatiotemporal metadata into the data packets and transmit the data packets if the step of inspecting the data packets reveals that the data packets are missing spatiotemporal metadata, otherwise transmit the data packets if the step of inspecting the data packets reveals that spatiotemporal metadata is already present in the data packets.

The machine-readable medium may be a recordable medium (e.g., floppy disks, hard drive, optical disks such as removable media 450, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used.

Processor device 420 can be configured to implement the methods, steps, and functions disclosed herein. The memory 430 could be distributed or local and the processor device 420 could be distributed or singular. The memory 430 could be implemented as an electrical, magnetic or optical memory, or any combination of these or other types of storage devices. Moreover, the term "memory" should be construed broadly enough to encompass any information able to be read from, or written to, an address in the addressable space accessed by processor device 420. With this definition, information on a network, accessible through network interface 425, is still within memory 430 because the processor device 420 can retrieve the information from the network. It should be noted that each distributed processor that makes up processor device 420 generally contains its own addressable memory space. It should also be noted that some or all of computer system 410 can be incorporated into an application-specific or general-use integrated circuit.

Optional video display 440 is any type of video display suitable for interacting with a human user of apparatus 400. Generally, video display 440 is a computer monitor or other similar video display.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A method for processing information streams produced by an application on end-computing devices that are transmitted over a wireless network having at least one network element, the method comprising the steps of:

inspecting, on the fly, data packets which originate from the end-computing devices and are received by the network element for spatiotemporal metadata in the data packets themselves;

consulting user-configurable permission rules that dictate what spatiotemporal metadata is permissible and what spatiotemporal metadata is impermissible for the application; and inserting spatiotemporal metadata into the data packets themselves in accordance with the user-configurable permission rules and transmitting the data packets if the step of inspecting the data packets reveals that the data packets are missing spatiotemporal metadata, otherwise conforming existing spatiotemporal metadata with the user-configurable permission rules and transmitting the data packets if the step of inspecting the data packets reveals that spatiotemporal metadata is already present in the data packets themselves,
wherein the user-configurable permission rules further designate a granularity of spatiotemporal metadata inserted into the data packets depending on one or more of an origin of the data packets, a destination of the data packets, application to which the data packets relate, time, and date, and wherein the steps of inserting and conforming are performed only for application data-carrying packets meant to be processed by end-user applications.

2. The method of claim 1, wherein the step of inserting spatiotemporal metadata into the data packets comprises the step of:
inserting permissible spatiotemporal metadata into the data packets and transmitting the data packets if the step of inspecting the data packets reveals that the data packets are missing spatiotemporal metadata or contain impermissible spatiotemporal metadata, otherwise transmitting the data packets if the step of inspecting the data packets reveals that spatiotemporal metadata is already present and that the spatiotemporal metadata present is permissible.

3. The method of claim 1, wherein the permission rules are related to privacy guidelines regarding the spatial metadata in the data packet.

4. The method of claim 1, further comprising the step of:
consulting permission rules that dictate when spatiotemporal metadata may be inserted into the data packets, and wherein the step of inserting spatiotemporal metadata into the data packets is performed in accordance with the permission rules.

5. The method of claim 4, wherein the permission rules include inserting spatiotemporal metadata into the data packets once per source destination flow or over a given interval of time.

6. The method of claim 4, wherein the step of inserting spatiotemporal metadata into the data packets comprises the step of:
inserting permissible spatiotemporal metadata into the data packets and transmitting the data packets if the step of inspecting the data packets reveals that the data packets are missing spatiotemporal metadata or contain impermissible spatiotemporal metadata, otherwise transmitting the data packets if the step of inspecting the data packets reveals that spatiotemporal metadata is already present and that the spatiotemporal metadata present is permissible.

7. The method of claim 1, wherein the network element comprises at least one of a WiFi base station, a gateway, a sensor network controller and a femto cell access point.

8. The method of claim 1, further comprising the steps of:
configuring the network element with spatial metadata related to a location of the network element; and
using the spatial metadata for the network element to supplement or replace the spatiotemporal metadata already present in the data packets.

9. The method of claim 8, wherein the step of configuring the network element is performed by a user of one of the end-computing devices.

10. The method of claim 8, wherein the step of configuring the network element is performed remotely by a network service provider of a network to which the network element is connected.

11. The method of claim 8, wherein the step of configuring the network element is performed by the network element using global positioning system information.

12. The method of claim 1, further comprising the step of: configuring the network element with the permission rules.

13. The method of claim 1, wherein the step of inspecting the data packets is performed by the network element using deep packet inspection.

14. The method of claim 1, further comprising the step of:
removing the spatiotemporal metadata already present in the data packets if the spatiotemporal metadata already present in the data packets is impermissible.

15. The method of claim 1, wherein the step of inspecting the data packets reveals that spatiotemporal metadata is already present in the data packets themselves, and wherein the step of conforming the existing spatiotemporal metadata with the user-configurable permission rules comprises the step of:
modifying the existing spatiotemporal metadata to conform with the user-configurable permission rules.

16. The method of claim 1, wherein the step of inspecting the data packets reveals that spatiotemporal metadata is already present in the data packets themselves, and wherein the step of conforming the existing spatiotemporal metadata with the user-configurable permission rules comprises the step of:
removing the existing spatiotemporal metadata to conform with the user-configurable permission rules.

17. A wireless network over which information streams produced by an application on end-computing devices are transmitted, the network having at least one network element comprising:
a memory; and
at least one processor device, coupled to the memory, operative to:
inspect, on the fly, data packets which originate from the end-computing devices and are received by the network element for spatiotemporal metadata in the data packets themselves;
consult user-configurable permission rules that dictate what spatiotemporal metadata is permissible and what spatiotemporal metadata is impermissible for the application; and
insert spatiotemporal metadata into the data packets themselves in accordance with the user-configurable permission rules and transmit the data packets if the step of inspecting the data packets reveals that the data packets are missing spatiotemporal metadata, otherwise conform existing spatiotemporal metadata with the user-configurable permission rules and transmit the data packets if the step of inspecting the data packets reveals that spatiotemporal metadata is already present in the data packets themselves,
wherein the user-configurable permission rules further designate a granularity of spatiotemporal metadata inserted into the data packets depending on one or more of an origin of the data packets, a destination of the data packets, application to which the data packets relate, time, and date, and wherein the insert and conform steps are performed only for application data-carrying packets meant to be processed by end-user applications.

18. An article of manufacture for processing information streams produced by an application on end-computing devices that are transmitted over a wireless network having at least one network element comprising a non-transitory machine-readable recordable medium containing one or more programs which when executed implement the steps of:

inspecting, on the fly, data packets which originate from the end-computing devices and are received by the network element for spatiotemporal metadata in the data packets themselves;

consulting user-configurable permission rules that dictate what spatiotemporal metadata is permissible and what spatiotemporal metadata is impermissible for the application; and inserting spatiotemporal metadata into the data packets themselves in accordance with the user-configurable permission rules and transmitting the data packets if the step of inspecting the data packets reveals that the data packets are missing spatiotemporal metadata, otherwise conforming existing spatiotemporal metadata with the user-configurable permission rules and transmitting the data packets if the step of inspecting the data packets reveals that spatiotemporal metadata is already present in the data packets themselves, wherein the user-configurable permission rules further designate a granularity of spatiotemporal metadata inserted into the data packets depending on one or more of an origin of the data packets, a destination of the data packets, application to which the data packets relate, time, and date, and wherein the steps of inserting and conforming are performed only for application data-carrying packets meant to be processed by end-user applications.

* * * * *